(12) United States Patent
Arimizu et al.

(10) Patent No.: US 6,243,083 B1
(45) Date of Patent: Jun. 5, 2001

(54) VIDEO SIGNAL PROCESSING CIRCUIT

(75) Inventors: Akira Arimizu; Shozo Mitarai, both of Kagoshima; Toshiaki Inoue, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/119,623

(22) Filed: Jul. 21, 1998

(30) Foreign Application Priority Data

Jul. 23, 1997 (JP) .................................................... 9-197223

(51) Int. Cl.$^7$ ...................................................... G09G 5/00
(52) U.S. Cl. ........................... 345/204; 345/429; 348/661
(58) Field of Search ................................... 345/154, 204, 345/429; 348/659, 661

(56) References Cited

U.S. PATENT DOCUMENTS

| | | | |
|---|---|---|---|
| 4,316,215 | * 2/1982 | Yasumoto et al. | 358/37 |
| 4,553,157 | * 11/1985 | Hurst, Jr. et al. | 348/631 |
| 5,028,991 | * 7/1991 | Sekizawa et al. | 358/537 |
| 5,202,756 | * 4/1993 | Sasaki et al. | 348/223 |
| 5,274,444 | 12/1993 | Kayashima . | |
| 5,298,982 | * 3/1994 | Lagoni | 348/713 |
| 5,345,277 | * 9/1994 | Blankevoort et al. | 348/679 |
| 5,585,856 | * 12/1996 | Nakaya et al. | 348/441 |

FOREIGN PATENT DOCUMENTS 40044693   1/1992 (JP) .

* cited by examiner

*Primary Examiner*—Bipin Shalwala
*Assistant Examiner*—Ricardo Osorio
(74) *Attorney, Agent, or Firm*—Ronald P. Kananen; Rader, Fishman & Grauer

(57) ABSTRACT

To obtain a clear-cut picture image by correcting a contour of a video signal of a natural picture image and the like from a computer.

Video signals of, for example, three primary colors (R, G, B), including a natural picture image and the like produced by, for example, a computer from input terminals 1 are supplied to a mixing circuit (2) and mixed at a ratio of, for example, 0.6G+0.3R+0.1B to produce a signal corresponding to a luminance (Y). This signal is supplied to differentiation circuits 3A and 3B having different time constants each other and predetermined high frequency components are extracted therefrom, respectively, and these output signals are selected by a switch (4), and then supplied to an amplifying circuit 5. The gain of the amplifying circuit 5 is arbitrarily controlled by a signal from a control terminal (6). Then, a signal from the amplifying circuit (5) is supplied to adding circuits 7R, 7G and 7B and added therein to respective video signals of R, G and B to then be derived from output terminals 8R, 8G and 8B.

4 Claims, 2 Drawing Sheets

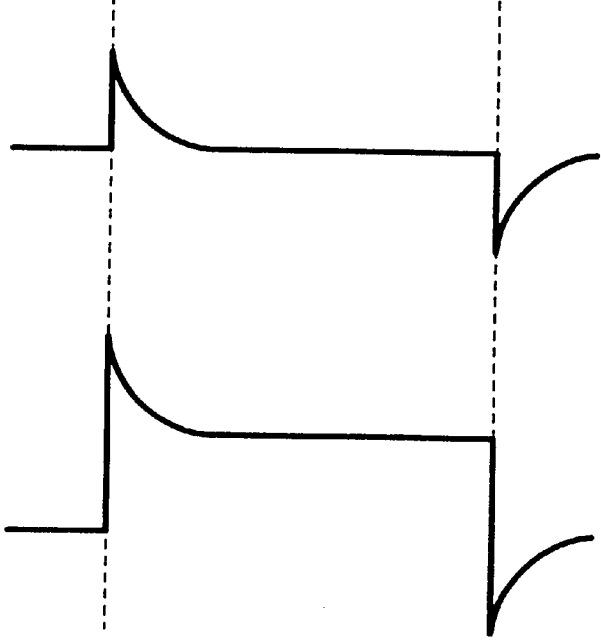

VIDEO SIGNAL PROCESSING CIRCUIT

BACKGROUND OF THE INVENTION

1. Field of the Invention

The present invention relates to a video signal processor or processing circuit suited for being used in, for example, a display for a computer.

2. Description of the Related Art

In a conventional display for a computer, for example, because a video signal produced by the computer is generally high in contrast, such the video signal is displayed as it is on the display without being emphasized in its contour.

In recent years, however, with the spread of a so-called internet, a CD-ROM and the like, fetching of a photograph, a natural picture image and a moving picture to a computer is carried out. In that case, a video signal obtained by fetching the natural picture image is different from a video signal produced by the conventional computer in that, for example, its contour and the like are apt to be blurred. Therefore, when such the video signal is displayed on a display, a fear that a clear-cut image can not be obtained is arising.

SUMMARY OF THE INVENTION

Therefore, according to the present invention, a plurality of inputted primary color signals are mixed at a predetermined ratio respectively, and a high frequency component of the mixed signal is extracted and added to each of the plurality of primary color signals, by which the contour of the video signals such as an natural picture image or the like can be corrected and a clear-cut picture image can be obtained.

BRIEF DESCRIPTION OF THE DRAWINGS

FIGS. 2A, 2B and 2C are waveform diagrams used for explaining an operation of the video signal processing circuit shown in FIG. 1.

DESCRIPTION OF THE PREFERRED EMBODIMENT

Figure 1:
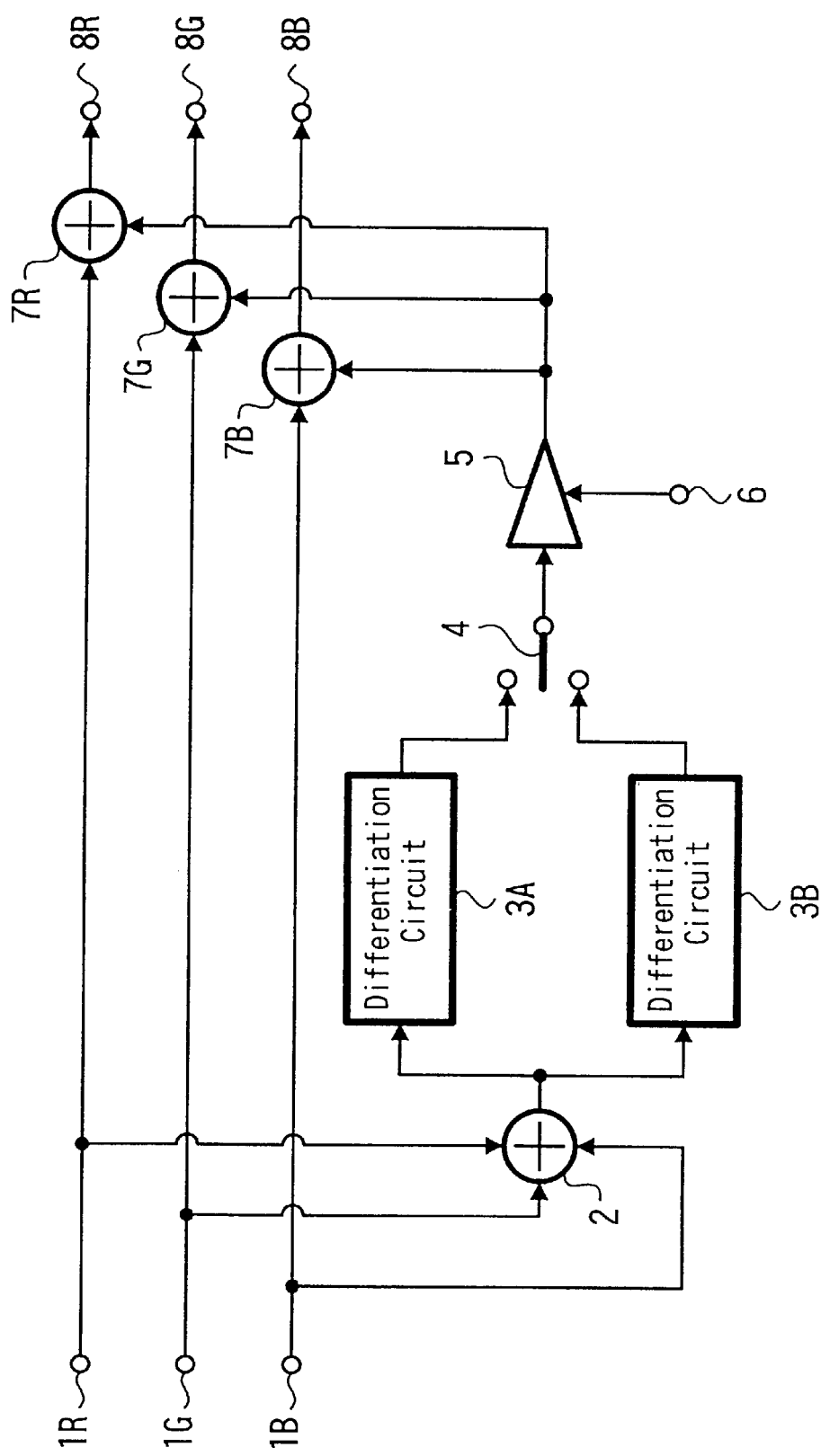
FIG. 1 is a block diagram showing the arrangement of an example of the video signal processing circuit according to the present invention.

Briefly speaking, the present invention is arranged such that a plurality of primary color signals are inputted and the plurality of inputted primary color signals are mixed at a predetermined ratio respectively to produce a signal corresponding to a luminance. A high frequency component of the signal corresponding to the luminance is extracted and added to each of the plurality of primary color signals.

Hereafter, the present invention will be explained with reference to the drawings. FIG. 1 is a block diagram showing a structure of one example of an essential portion of a computer display apparatus to which a video signal processing circuit according to the present invention is applied.

In FIG. 1, for example, video signals of three primary colors (RGB) including an natural picture image produced by, for example, a computer (not shown) are respectively supplied to input terminals 1R, 1G and 1B of a video signal processing circuit according to the present invention. The video signals of R, G and B from these input terminals 1R, 1G and 1B are supplied to a mixing circuit 2 and mixed therein at a ratio of, for example, 0.6G+0.3R+0.1B, whereby a signal corresponding to a luminance (Y) is produced therein.

The signal corresponding to the luminance (Y) is supplied to differentiation circuits 3A and 3B, each of them having a time constant different from each other, and predetermined high frequency components are extracted therefrom respectively. Further, the output signals of these differentiation circuits 3A and 3B are selected by a switch 4 and supplied to an amplifying circuit 5. Also, the gain of the amplifying circuit 5 is arbitrarily controlled by a signal from a control terminal 6.

As a result, a signal which is obtained by amplifying a predetermined high frequency component of the signal corresponding to the above-mentioned luminance (Y) with an arbitrary gain is derived from the amplifying circuit 5. Then, the signal from the amplifying circuit 5 is supplied to adding circuits 7R, 7G and 7B respectively provided on signal paths from the input terminals 1R, 1G and 1B, added to video signals of R, G and B therein and then derived from output terminals 8R, 8G and 8B led out from the adding circuits 7R, 7G and 7B, respectively.

That is, in this circuit, when a video signal shown in FIG. 2A is inputted to the input terminals 1R, 1G and 1B with a time delay, a similar signal is derived from the mixing circuit 2. The signal is supplied to the differentiation circuits 3A and 3B, and a predetermined high frequency component of the signal as shown in, for example, FIG. 2B is extracted therefrom. Then, the high frequency component is added to the original video signal in the adding circuits 7R, 7G and 7B, whereby an output signal as shown in FIG. 2C is produced.

Also, in this circuit, since one of the differentiation circuits 3A and 3B, each having a time constant different from each other, is selected by the switch 4 and then used, it is possible to extract the high frequency component corresponding to the natural picture image and the like fetched by, for example, a computer. Further, it is possible that the level of the high frequency component is controlled by the amplifying circuit 5 to emphasize a desired high frequency to thereby emphasize the contour of the picture image.

As a result, video signals of R, G and B, in which the high frequency (contour) of the video signals inputted to the input terminals 1R, 1G and 1B is emphasized, are derived from the output terminals 8R, 8G and 8B, respectively. Then, the contour of the natural picture image or the like is corrected and the clear-cut picture image can be obtained by supplying the video signals from the output terminals 8R, 8G and 8B to a display apparatus such a cathode ray tube (CRT), a liquid crystal display (LCD) apparatus.

Accordingly, in this apparatus, when a plurality of primary color signals are mixed at a predetermined ratio respectively, the high frequency component of the mixed signal is extracted and added to each of the plurality of the primary color signals, the clear-cut picture image can be obtained by the fact that the contour of the video signal of the natural picture image or the like is corrected.

As a result, although there has been a fear up to now that when the video signal of the natural picture image and the like fetched in, for example, the computer is to be displayed on the display, the contour and the like are apt to be blurred and a clear-cut picture image can not be obtained, these problems can easily be solved by the present invention.

Also, when the differentiation circuits, each having a time constant different from each other, are selected and then used, it is possible to extract the high frequency component in accordance with a picture quality and the like of the natural picture image fetched in, for example, the computer.

Further, by controlling the level of the high frequency component, it is possible to emphasize a desired high frequency (contour).

In case of a high contrast video signal generated by the computer, it may be possible that by selecting-the differentiation circuits 3A and 3B, turning the switch 4 off or adjusting the gain of the amplifying circuit 5, the high frequency component is not extracted or is not added to one video signal, and the output signal is delivered.

In this manner, according to the above-mentioned video signal processing circuit, when a plurality of primary color signals are inputted, the plurality of the inputted primary color signals are respectively mixed at a predetermined ratio to produce a signal corresponding to a luminance, and the high frequency component of the signal corresponding to the luminance is extracted to be added to each of the plurality of primary color signals, the contour of the video signal of the natural picture image and the like are corrected, thereby making it possible to obtain a clear-cut picture image.

Therefore, according to the invention, since a plurality of the inputted primary color signals are respectively mixed at a predetermined ratio, the high frequency component of the mixed signal is extracted and then added to each of the plurality of primary color signals, the contour of the video signal of the natural picture image and the like are corrected and the clear-cut picture image can be obtained.

As a result, although there has been a concern that when a video signal of the natural picture image and the like fetched in, for example, the computer is to be displayed on the display, the contour and the like, for example, are apt to be blurred and the clear-cut image can not be obtained, these problems can easily be solved by the present invention.

According to the present invention, since the differentiation circuits, each having a time constant different from each other, are selected and then used, it is possible to extract the high frequency component in accordance with the picture quality and the like of the natural picture image fetched by, for example, the computer. Further, by controlling the level of the high frequency component, it is possible to emphasize a desired high frequency (contour).

Having described a preferred embodiment of the present invention with reference to the accompanying drawings, it is to be understood that the present invention is not limited to the above-mentioned embodiments and that various changes and modifications can be effected therein by one skilled in the art without departing from the spirit or scope of the novel concept of the present invention as defined in the appended claims.

What is claimed is:

1. A video signal processing circuit, comprising:

means for inputting or producing a plurality of primary color signals;

means for mixing said plurality of said inputted primary color signals at a predetermined ratio to produce a signal corresponding to a luminance; and means for extracting a high frequency component of said signal corresponding to the luminance and adding the high frequency component to each of said plurality of primary color signals.

2. A video signal processing circuit as claimed in claim 1, wherein said plurality of primary color signals are produced by a computer and wherein processed video signals are displayed on a display.

3. A video signal processing circuit according to claim 1, comprising:

a mixing circuit for mixing said plurality of inputted or produced primary color signals at a predetermined ratio;

a differentiation circuit for extracting a high frequency component of the signal corresponding to said luminance;

an amplifying circuit for amplifying a signal from said differentiation circuit; and an adding circuit for adding a signal from the amplifying circuit to each of said to plurality of primary color signals.

4. A video signal processing circuit as claimed in claim 3, wherein said circuit further comprises a second differentiation circuit, wherein said differentiation circuit and second differentiation circuit have different time constants, and wherein said circuit further comprises means for controlling a gain of said amplifying circuit.

* * * * *